United States Patent [19]

Horbach et al.

[11] 3,939,118

[45] Feb. 17, 1976

[54] PROCESS FOR REMOVING CONTAMINANTS FROM POLYCARBONATE SOLUTIONS

[75] Inventors: Alfred Horbach, Krefeld; Hugo Vernaleken, Krefeld-Bockum, both of Germany

[73] Assignee: Bayer Aktiengesellschaft, Leverkusen, Germany

[22] Filed: Sept. 24, 1974

[21] Appl. No.: 508,948

[30] Foreign Application Priority Data
Oct. 6, 1973 Germany............................ 2350327

[52] U.S. Cl.......... 260/47 XA; 210/24; 260/77.5 D; 260/DIG. 33
[51] Int. Cl.$^2$.................... C08G 63/74; C08G 63/62
[58] Field of Search... 260/47 XA, DIG. 33, 77.5 D; 210/24

[56] References Cited
UNITED STATES PATENTS

| | | | |
|---|---|---|---|
| 3,066,116 | 11/1962 | Schillo et al. | 210/24 |
| 3,161,488 | 12/1964 | Eastwood et al. | 210/24 |

FOREIGN PATENTS OR APPLICATIONS

| | | | |
|---|---|---|---|
| 1,193,240 | 5/1970 | United Kingdom | 260/47 XA |

*Primary Examiner*—Wilbert J. Briggs, Sr.
*Attorney, Agent, or Firm*—Lawrence S. Pope; Gene Harsh

[57] ABSTRACT

The contaminating inorganic compounds such as alkali metal salts or alkali metal hydroxides which remain in a polycarbonate solution prepared by reacting phosgene with a dihydroxy-aryl compound are removed by contacting the solution with a molecular sieve.

13 Claims, No Drawings

PROCESS FOR REMOVING CONTAMINANTS FROM POLYCARBONATE SOLUTIONS

The phase boundary condensation process of the type disclosed in U.S. Pat. No. 3,028,365 is one process for the preparation of aromatic polycarbonates. In this process, dihydroxydiaryl compounds are reacted with phosgene in a two-phase mixture of aqueous alkali metal hydroxide solution and solvent. After the polycondensation, the phases are separated. The polycarbonates are isolated from the organic solvent phase either by evaporating off the solvent or by precipitation. To produce high quality polycarbonates it is necessary quantitatively to remove from the polycarbonate phase the inorganic constituents originating from the reaction, above all the alkali metal chlorides and alkali metal hydroxides. One common process for the removal of these harmful foreign constituents is repeated extraction of the polycarbonate solutions with electrolyte-free water. This operation, which can be carried out in centrifuges, mixer-separator systems or extraction columns, however, requires considerable technical effort since viscous solutions have to be processed. A further disadvantage of such a process is the very high consumption of electrolyte-free water. This applies particularly if the salt like foreign constituents have to be removed quantitatively from polycarbonates which are exposed to high temperatures.

An object of the present invention is to provide a simple and effective process for the removal of inorganic foreign constituents from polycarbonate solutions. Another object of the invention is to provide a process for removing inorganic byproducts remaining in the polycarbonate phase after the polycarbonate has been made by reaction of a carbonic acid derivative such as, phosgene with dihydroxydiaryl compound as disclosed in the aforesaid patent.

The foregoing objects and others are accomplished in accordance with this invention, generally speaking, by providing a process wherein a polycarbonate solution containing inorganic contaminants such as, alkali metal chlorides and alkali metal hydroxides and the like is contacted with a molecular sieve moist with water until such contaminants are removed. The water content of the molecular sieves useful in the process of the instant invention, depends on the kind of molecular sieve employed and differs between 100% and 20% of the saturation concentration of the molecular sieve.

The process according to the invention permits simple and economical removal of the harmful inorganic foreign constituents from a polycarbonate. This process neither requires technically involved apparatuses, such as for example, high speed centrifuges, not major amounts of electrolyte-free water, since the amounts of water required for the regeneration of the molecular sieves are practically negligible and amount to at most one-tenth of the amounts used for the extraction.

Hitherto, molecular sieves have been used for dehydrating organic solutions. The fact that desalinations can also be carried out with molecular sieves containing water is new. The desalination does not take place by an ion exchange mechanism.

The manipulation and execution of the process according to the invention are simple and require little technical effort. A process which can be carried out in practice consists of bringing the organic polycarbonate solutions, obtained from the phase boundary process after separating off the aqueous phase, into contact with molecular sieves which have first been washed free of salt with electrolyte-free water, until the polycarbonate solutions are quantitatively desalinated. A suitable apparatus is a column filled with molecular sieves. This columnn is charged, in a continuous process, with the polycarbonate solution which contains a salt. When the charge capacity has been reached, regeneration is effected by rinsing with electrolyte-free water until the effluent is salt-free.

Any suitable molecular sieves which are hydrophilic gels, have a pore structure and can be reversibly hydrated with water may be used in practicing the invention.

Examples of gels of this nature are granular natural or snythetic silica-alumina materials which are as free of binder as possible and have lattice structures of the zeolite type (see, on this subject, the monograph Molekularsiebe (Molecular Sieves) by O. Grubner, P. Jiro and M. Ralek, VEB-Verlag der Wissenschaften, Berlin 1968), with pore widths of 2 A to 10 A (Bayer Zeolith); silica gel (Merckosorb (a product marketed by Messrs E. Merck Darmstadt)) with pore widths of 40 A to 100 A, which are optionally absorbed in glass beads (Perisorb (a product marketed by Messrs. E. Merck Darmstadt)); also modified borosilicate glasses according to W. Haller (J. Chem. Phys. 42, 686 (1965)) with pore widths between 75 A and 2,400 A, which are marketed under the tradename Controlled Pore Glass by Electro Nucleonics, Inc., Fairfield, N.A. U.S.A. Molecular sieves based on organic products are also to be included under this group of materials. These include 3-dimensionally crosslinked polysaccharides such as, for example, dextran gels (Sephadex grades (a product marketed by Messrs. Pharmacia Fine Chemicals, Uppsala, Sweden)), which can optionally be alkylated (Sephadex-LH grades (a product marketed by Messrs. Pharmacia Fine Chemicals, Uppsala, Sweden)), agarose gels (Sepharose (a product marketed by Messrs. Pharmacia Fine Chemicals, Uppsala, Sweden)), cellulose gels and agar gels. As further examples of synthetic organic gels there should be mentioned crosslinked polyacrylamides and polyethylene oxides crosslinked via acrylate groups (Merckogel, Merckogel OR (a product marketed by Messrs. Merck, Darmstadt)). Ion exchange gels which, because of their hydrophilic groups, are able to bind water reversibly are also suitable. As examples there may be mentioned: three-dimensionally crosslinked polystyrenes provided with sulphonic acid groups (Bayer Lewatite) and the dextran gels already mentioned above, where they possess the acid groups or ammonium groups required for ion exchange (dextran gel ion exchangers).

Among the molecular sieves mentioned by way of examples and defined in the sense of the invention, the molecular sieves of the zeolite type are preferred. The particular advantage of this class of molecular sieve resides in their very good chemical resistance to the system used, in good handling when using granular types and in the low resistance to flow coupled simultaneously with low abrasion. However, the criteria just mentioned are not of decisive importance with regard to the effectiveness of the molecular sieves.

The charge capacities of the molecular sieves (milliequivalents of $Cl^-$/g of molecular sieve) are between 0.1 and 5.

In order to effect complete desalinations, slip-through curves are determined as a function of the initial concentration, which is generally between 200 and 50 ppm of Cl⁻. From these curves, contact times can be calculated. These are between 5 and 100 minutes.

The temperatures at which the desalination is carried out can lie between 5° and 100°C. They depend on the nature of the polycarbonate solvents used. In practice temperatures between 20° and 40°C are preferred.

For regeneration, the charged molecular sieves are desalinated with water. The amounts of water required for this purpose are generally 2 to 10 times the weight of the molecular sieves. The desalination is advantageously carried out at higher temperatures, say 40°–80°C. This allows the regeneration times to be shortened. Between 2 and 40 minutes are generally required.

The regenerated molecular sieves contain between 5 and 20% by weight of water. They can be reused directly for the desalination of the polycarbonate solutions. However, in order not to transfer unnecessary amounts of water into the polycarbonate solutions it is advisable to effect a brief treatment with steam or warmed inert gases in order thereby to expel surface water.

All polycarbonate solutions, but preferably those which are obtained from the phase boundary process, of U.S. Pat. No. 3,028,365 and the like, can be desalinated by the process according to the invention. These solutions in general contain between 50 and 200 ppm of Cl⁻ in the organic phase.

The process is used preferentially for solutions of polycarbonates based on dihydroxydiarylalkanes. These polycarbonates in general have molecular weights between 10,000 and 200,000. Suitable solvents are the chlorinated hydrocarbons known, and used, for the preparation and solution of these high molecular aromatic polycarbonates, individually or as mixtures such as, for example, methylene chloride, chloroform, 1,2-dichloroethane and chlorobenzene. The polycarbonate concentrations in the solvent or solvent mixture can vary between 5 and 25% by weight. The preferred range is between 10 and 20% by weight.

The desalination effect is independent on the molecular weight of the polycarbonates used. Solutions of particularly high molecular polycarbonates can be diluted appropriately before desalination. Trouble-free working is possible with polycarbonate solutions of viscosities < 500 cP.

The polycarbonate solutions desalinated in accordance with the process of the invention are worked up in accordance with known techniques, for example by evaporating the solvents in stripping extruders or by precipitating the polycarbonates with non-solvents. The solutions can also be used directly for casting films or for spinning fibers.

Production of a polycarbonate solution:

61.2 kg of a solution of 48.75 kg of 2,2-bis-(4-hydroxyphenyl)propane, 237 kg of water, 39.4 kg of a 45 % sodium hydroxide solution, fifty g of sodium borhydride and 750 g of p-tert.-butylphenol is continuously treated per hour in a suitable apparatus with 4.75 kg of phosgene in 90 kg of methylene chloride/chlorobenzene in a ratio of 60 : 40 whilst adding 3 kg of a 45 % sodium hydroxide solution.

After the addition of 40 g per hour of triethylamine and 0.75 kg per hour of a 45 % sodium hydroxide solution, a polycarbonate with a relative viscosity of 1.303 is obtained after a main residence time of 30 minutes.

After separating off the aqueous phase, the organic polycarbonate solution is used for further experiments after the required dilution or concentration.

EXAMPLE 1

15 g of Bayer Zeolithe T 143 molecular sieve, of pore width 4 A, are shaken for 20 hours with 100 g of a 14.5% strength polycarbonate solution (bisphenol A polycarbonate, molecular weight approx. 31,000, solvent: methylene chloride/chlorobenzene in the ratio of 60:40), which contains 60 ppm of chloride ions and 0.25% of water, in a 300 ml Erlenmeyer flask. After this contact, the chloride ion content of the polycarbonate solution is < 2 ppm.

EXAMPLE 2

The procedure followed is analogous to Example 1 except that 1.0 g of water is added to the polycarbonate solution. After a contact time of 3 hours, the chloride ion content is < 2 ppm.

EXAMPLE 3

The procedure followed is analogous to Example 1 except that the molecular sieve is first moistened with water up to a content of 20 % by weight referred to the molecular sieve. After a contact time of less than 1 hour, no further chloride ions are detectable in the polycarbonate solution (< 2 ppm). The polycarbonate solution had had 0.25 % by weight of water.

EXAMPLE 4

The procedure followed is analogous to Example 3 except that Bayer Zeolithe T 134 of pore width 3 A is used as the molecular sieve. After a contact time of less than 1 hour, no further chloride ions are detectable in the polycarbonate solution (< 2 ppm).

EXAMPLE 5

The procedure followed is analogous to Example 3 except that Bayer Zeolithe K 154 of pore width 5 A is used as the molecular sieve. After a contact time of less than 1 hour, no further chloride ions are detectable (< 2 ppm).

EXAMPLE 6

The procedure followed is analogous to Example 1 except that the polycarbonate solution contains 1,020 ppm of chloride ions and 0.88% of water. After a contact time of 3 hours, the chloride ion content had fallen to 106 ppm.

EXAMPLE 7

400 g of Bayer Zeolithe T 143 molecular sieve are charged with 160 ml of water in a column (length 1,000 mm, diameter 30 mm). After a pre-absorption of water, 5 l of the polycarbonate solution described in Example 1 and containing 245 ppm of chloride ions are pumped through the column at a throughput of 2 l/hour. The polycarbonate solution which issues still contains 17 ppm of chloride ions.

EXAMPLE 8

The procedure followed is as in Example 7 except that four of the columns described there are connected in series. After the third column, the polycarbonate solution is free of chloride ions (< 2 ppm).

EXAMPLE 9

50 l of the polycarbonate solution characterized in Example 1, and having a chloride ion content of 245 ppm, are pumped through the column, filled with molecular sieve, described in Example 7. This exhausts the capacity of the column; the solution which issues has almost the same content of chloride ions as the solution introduced. The column filling is then washed with 350 ml of methylene chloride and regenerated by rinsing with 3 liters of water at 80°C and again charged with the polycarbonate solution. After a throughput of 45 liters, the capacity of the molecular sieve is exhausted.

EXAMPLE 10

Analogously to Example 7, a polycarbonate solution (bisphenol A polycarbonate, molecular weight approx. 110,000, solvent: methylene chloride) of 5.1% by weight solids concentration and having a chloride ion content of 62 ppm is pumped through the column filled with molecular sieve, for the purpose of desalination (throughput 0.425 l/hour, total amount 10 l). The polycarbonate solution issuing from the column has a chloride ion content of 19 ppm. This solution is pumped through the column a second time. The chloride ion content is then less than 2 ppm.

EXAMPLE 11

100 g of Bayer Zeolithe T 143 molecular sieve in a packed column are charged, after pre-absorption of 30 g of water, with the polycarbonate solution described in Example 1 until the capacity is exhausted. The molecular sieve is then regenerated with 3000 g of water at 80°C. The chloride ion content of the water is 2 080 mg. This corresponds to a charge capacity of 0.6 millieaquivalent/g of molecular sieve.

EXAMPLE 12

The procedure followed in analogous to Example 11 except that the polycarbonate solution contains 0.75% by weight of water. The charge molecular capacity was found to be 2.6 milliequivalents/g of molecular sieve.

EXAMPLE 13

100 g of the polycarbonate solution described in Example 1, containing 192 ppm of chloride ions, are brought into contact for 3 hours with 15 g of a dextran gel type Sephadex G 25 fine (pore width < 50 A, after pre-absorption of 30 g of water, particle size 20–80$\mu$). The chloride ion content after treatment is 6 ppm.

EXAMPLE 14

The procedure followed is analogous to Example 13 except that Sephadex G 25 coarse (particle size 100–300$\mu$) is used as the molecular sieve after pre-absorption of 30 g of water. After a contact time of 3 hours, the chloride ion content is 8 ppm.

EXAMPLE 15

The procedure followed is analogous to Example 13 except that Sephadex G 75 (pore width < 400 A) is used as the molecular sieve after pre-absorption of 100 g of water. After a contact time of 3 hours, the chloride ion content is < 2 ppm.

EXAMPLE 16

100 g of the polycarbonate solution described in Example 1, having a chloride ion content of 136 ppm, are brought into contact for 3 hours with 15 g of Merck silica gel grade 1,000 (particle size 0.06 – 0.2 mm, pore width 1,000 A after pre-absorption of water until saturation is reached). The chloride ion content after this treatment is 25 ppm.

EXAMPLE 17

The procedure followed is analogous to Example 16 except that the silica gel employed is Merckosorb Si 60 (particle size 30$\mu$, pore width 60 A) after pre-absorption with water. The chloride ion content after 3 hours contact time is < 4 ppm.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for removing inorganic compounds from polycarbonate solutions which comprises contacting a polycarbonate solution with a molecular sieve which is moist with water.

2. The process for removing inorganic compounds from a polycarbonate solution of claim 1 wherein the polycarbonate solution is obtained by phosgenation of dihydroxydiarylalkane in a two-phase mixture of aqueous alkali metal hydroxide solution and chlorinated hydrocarbon as the solvent and the solution has solids concentrations of 5–25% by weight of polycarbonate.

3. The process for removing inorganic compounds from a polycarbonate solution of claim 1 wherein the molecular sieve is a natural or synthetic zeolite with pore widths between 2 and 10 A.

4. The process for removing inorganic salts from polycarbonate solutions of claim 1 wherein the molecular sieve is a water-swellable three-dimensionally cross-linked polysaccharide.

5. The process for removing inorganic salts from polycarbonate solutions of claim 1 wherein the molecular sieve is a silica gel or a porous glass.

6. A continuous process for removing inorganic salts from a polycarbonate solution according to the process of claim 1 wherein the polycarbonate solution is brought into contact with a molecular sieve in a column filled with the latter at a temperature between 5° and 100°C, for a period of 5–100 minutes.

7. A process for removing inorganic contaminants from a polycarbonate in solution in an organic solvent therefor which comprises contacting the solution with a moist porous hydrophilic gel adapted to be reversibly hydrated with water until the contaminants are absorbed on the gel, and thereafter separating the polycarbonate solution from the gel.

8. The process of claim 7 wherein the contaminants include an alkali metal salt or an alkali metal hydroxide.

9. A process for removing inorganic compounds from a solution of a polycarbonate in a solvent which comprises contacting said solution with a molecular sieve wherein the sieve is moist or the solution contains sufficient water to moisten the sieve.

10. The process of claim 9 wherein the sieve has a water content of between 20 and 100 % of its saturation capacity.

11. The process of claim 9 wherein the solution contains between 5 and 20 wt.% water based upon the weight of molecular sieve contacted.

12. The process of claim 9 wherein the solution contains sufficient water to moisten the molecular sieve to between 20 and 100 % of its saturation capacity and the sieve is dry before contacting it with said solution.

13. The process of claim 9 wherein the sieve contains between 20 and 100 wt.% of its saturation concentration of water and the solution contains water.

* * * * *